(12) United States Patent
Eckelberry

(10) Patent No.: US 6,634,655 B2
(45) Date of Patent: Oct. 21, 2003

(54) DOCK HEIGHT HOLD DEVICE

(75) Inventor: James Eckelberry, Canton, OH (US)

(73) Assignee: Meritor Light Vehicle Technology, LLC., Troy, MI (US)

( * ) Notice: Subject to any disclaimer, the term of this patent is extended or adjusted under 35 U.S.C. 154(b) by 128 days.

(21) Appl. No.: 09/815,021

(22) Filed: Mar. 22, 2001

(65) Prior Publication Data

US 2002/0135150 A1 Sep. 26, 2002

(51) Int. Cl.$^7$ .............................................. B60G 17/00
(52) U.S. Cl. .................................................. 280/6.151
(58) Field of Search ......................... 280/124.116, 754, 280/755, 6.151, 6.154, 6.159, 6.157, 5.514

(56) References Cited

U.S. PATENT DOCUMENTS 6,224,074 B1 * 5/2001 Cadden ................... 280/86.75
6,257,597 B1 * 7/2001 Galazin ............... 280/124.116

\* cited by examiner

Primary Examiner—Paul N. Dickson
Assistant Examiner—Faye M. Fleming
(74) Attorney, Agent, or Firm—Carlson, Gaskey & Olds

(57) ABSTRACT

A dock height hold device is provided for a vehicle including a frame supporting a cargo area. A suspension is pivotally connected to the frame and supports an axle. Air springs, which are typically a part of an active ride suspension system, are arranged between the frame and suspension to maintain a ride height between the frame and suspension between vehicle travel. According to the present invention, a pedestal preferably is supported on the suspension. The pedestal is rotatably movable between a hold position in which the pedestal extends from the suspension to a location proximate to the frame and a retracted position in which the pedestal is further from the frame than when in the hold position. An actuator, which is presently mounted between a portion of the suspension and the pedestal, moves the pedestal between the hold and retracted positions for maintaining a desired space in between the suspension and the frame in the hold position. The air springs typically maintain a sufficient space between the frame and the suspension such that the pedestal may be rotated uninhibited into the hold position. In the hold position, there is preferably approximately a ¾ inch clearance between the pedestal and the frame. As a result, the cargo area is permitted to shift an insignificant amount, limited to ¾ inch, during shifts of cargo in the cargo area of the trailer.

8 Claims, 2 Drawing Sheets

DOCK HEIGHT HOLD DEVICE

BACKGROUND OF THE INVENTION

This invention relates to a suspension for a truck or trailer, and more particularly, the invention relates to a suspension stabilization device for a truck or trailer.

Trucks having trailers or cargo containers frequently unload their cargo onto a loading dock. The vehicle is backed into the dock loading and unloading area so that lift trucks and other cargo carrying devices may enter the cargo area of the vehicle trailer. As the lift trucks load and unload the cargo of the vehicle, the angle of the cargo floor may change dramatically as a result of the load being shifted. As a result, it may be unsafe for the operator and difficult if not impossible for the lift truck to navigate its way through the cargo area and into and out of the dock area.

Active ride suspension systems are frequently used to maintain the ride height of the vehicle trailer when the vehicle travels along a roadway. The active suspension system includes inner springs which are inflated and deflated to raise or lower the trailer relative to the axle to maintain ride height. Active ride suspension systems are unsuitable to maintain dock height because the response time of the system is insufficient to adjust the air springs to accommodate the shift in trailer height as the weight of the cargo is shifted in the cargo area of the trailer. That is, the air springs simply may not be inflated or deflated rapidly enough to adjust the height of the cargo area relative to the suspension. Therefore, what is needed is a mechanism to maintain the dock height of the trailer cargo area relative to the dock area during unloading and loading of cargo.

SUMMARY OF THE INVENTION AND ADVANTAGES

The present invention provides a dock height hold device for a vehicle including a frame supporting a cargo area. A suspension is pivotally connected to the frame and supports an axle. Air springs, which are typically a part of an active ride suspension system, are arranged between the frame and suspension to maintain a ride height between the frame and suspension between vehicle travel. According to the present invention, a pedestal preferably is supported on the suspension. The pedestal is rotatably movable between a hold position in which the pedestal extends from the suspension to a location proximate to the frame and a retracted position in which the pedestal is further from the frame than when in the hold position. An actuator, which is presently mounted between a portion of the suspension and the pedestal, moves the pedestal between the hold and retracted positions for maintaining a desired space in between the suspension and the frame in the hold position. The air springs typically maintain a sufficient space between the frame and the suspension such that the pedestal may be rotated uninhibited into the hold position. In the hold position, there is preferably approximately a ¾ inch clearance between the pedestal and the frame. As a result, the cargo area is permitted to shift an insignificant amount, limited to ¾ inch, during shifts of cargo in the cargo area of the trailer.

Accordingly, the above invention provides a mechanism to maintain the dock height of the trailer cargo area relative to the dock area during unloading and loading of cargo.

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENT

Figure 1A:
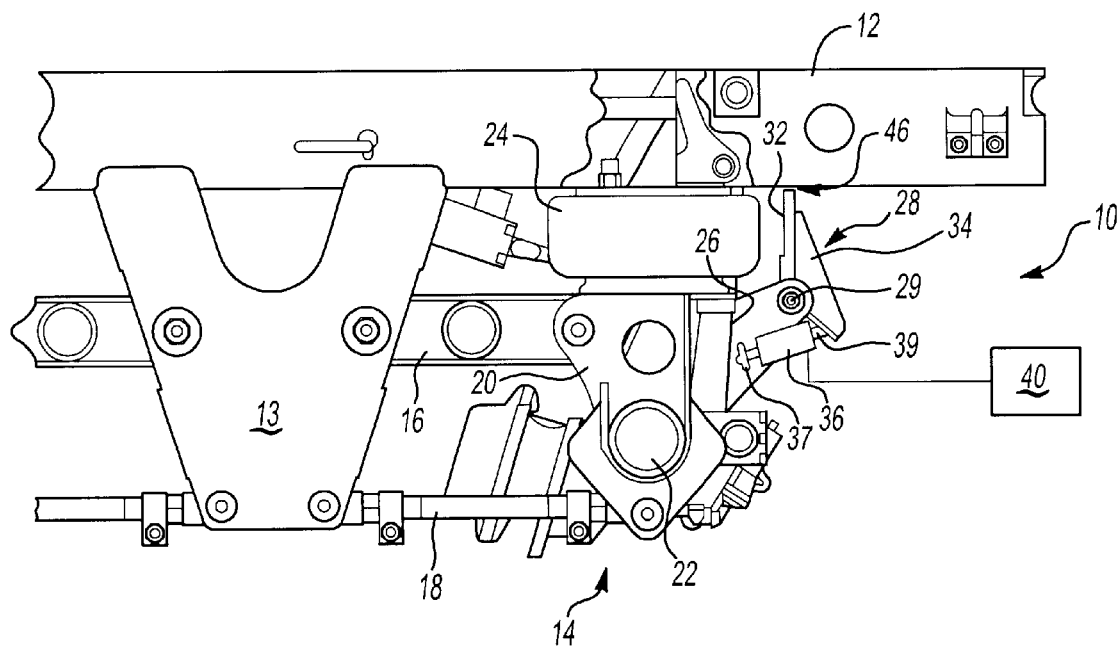
FIG. 1A is a side elevational view of the driver side of a rear suspension.
Figure 1B:
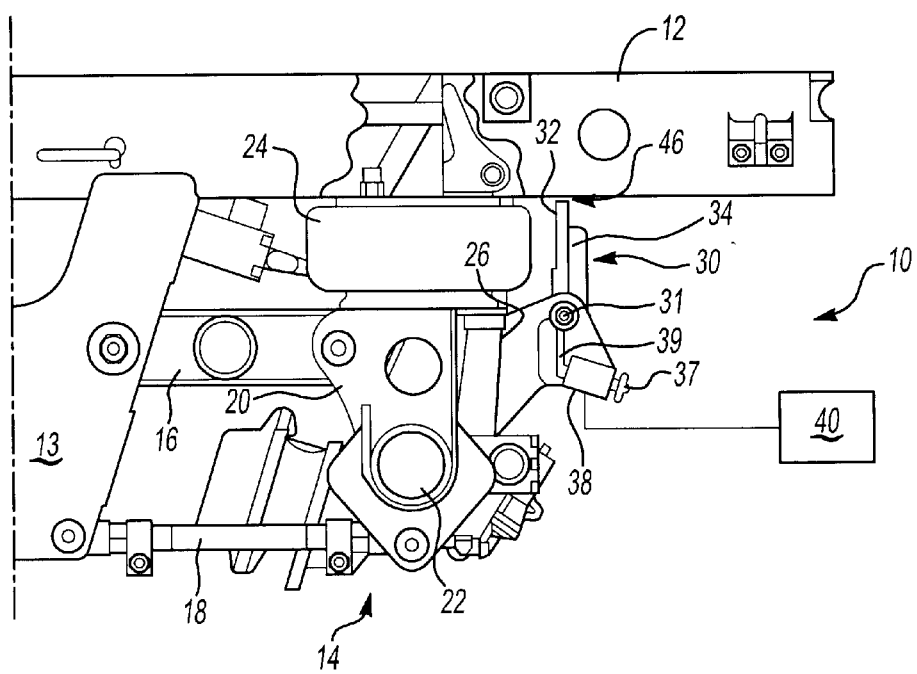
FIG. 1B is a side elevational view of the passenger side of a rear suspension.
Figure 2:
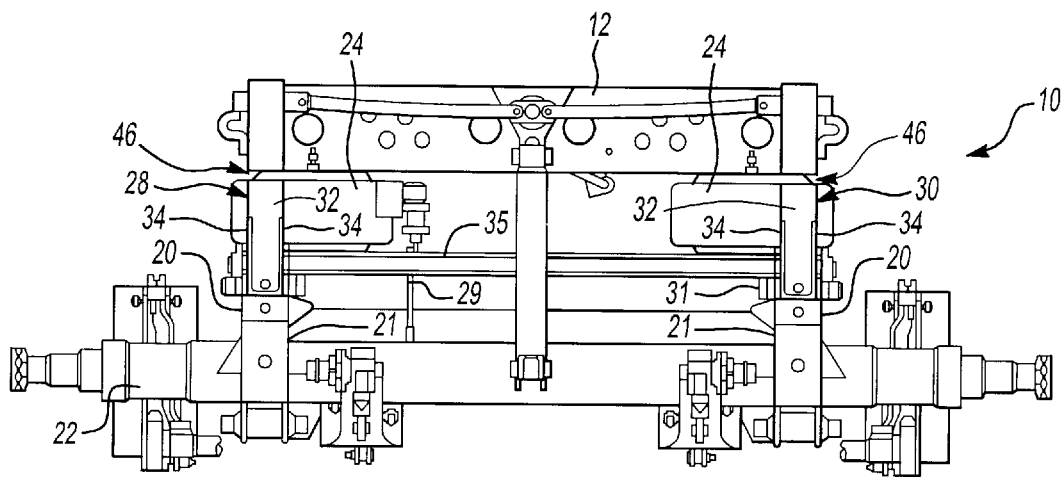
FIG. 2 is a rear elevational view of the suspension shown in FIGS. 1A and 1B.

A dock height hold device 10 is generally shown in FIGS. 1A and 1B. Preferably the dock height hold device is used at the rear of the vehicle, which is the closest to the dock area during loading and unloading. In FIG. 1A, the driver side of the rear suspension is shown, and in FIG. 1B the passenger side of the rear suspension is shown. Frame 12 includes a downwardly extending bracket 13 for supporting the suspension 14. It is to be understood that the frame and suspension may be part of a tractor trailer or a portion of a truck cargo area that is integrated with the vehicle cab. The suspension 14 includes an upper arm 16 and a lower arm 18 to form a 4-bar linkage. Pairs of brackets 20, 21, which is best shown in FIG. 2, are used on each side of the suspension 14 to connect the arms 16, 18 and support axle 22. It is to be understood that the present invention may be used with other suspension configurations.

Air ride suspension systems are commonly used to control the ride height during vehicle travel. Air ride suspension systems include air springs 24 arranged between the frame 12 and suspension 14 to dampen the harsh inputs from the road surface and maintain ride height. A shock absorber 26 is arranged between the suspension 14 and frame 12 to further dampen the road inputs. The air springs 24 are inflated and deflated to adjust any ride height of the frame and attached cargo area during vehicle travel. However, as discussed above, the air ride suspension system and air springs 24 are typically insufficient to control the height of the frame 12 and attached cargo area during loading and unloading of cargo from the trailer to the dock area.

Figure 3:
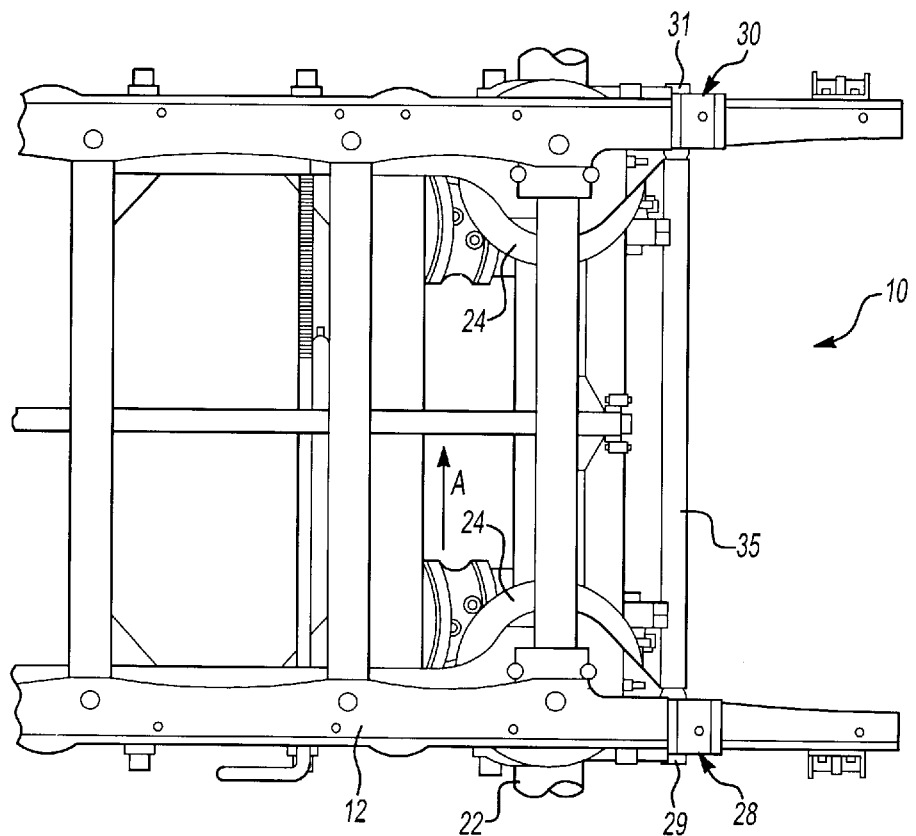
FIG. 3 is a top elevational view of the rear suspension shown in FIG. 2.

The present invention preferably includes a pair of pedestals 28, 30 for each side of the suspension. The pedestals 28, 30 are pivotally connected to the suspension at pivotal connections 29, 31, respectively. The pedestals include a plate 32 having reinforcement ribs 34 to structurally reinforce the plate 32 for supporting the load of the frame 12 and the cargo area attached thereto. Preferably, a shaft 35 connects the pedestals 28, 30 for rotation together, as shown in FIG. 3. A pair of actuators 36, 38 are arranged between the suspension 14 and the pedestals 28, 30. The actuators 36, 38 are attached to the suspension 14 at attachment point 37 and to the pedestals 28, 30 at attachment point 39. The actuators 36, 38 move the pedestals 28, 30 between a hold position, shown in FIGS. 1A and 1B, and a retracted position. In the hold position the pedestal extends from the suspension 14 to a location proximate to the frame 12. The actuators 36, 38 are positioned in a double acting arrangement. That is, one actuator moves in one direction to move the pedestals 28, 30 from a retracted position to a hold position, and the other actuator moves the pedestal 28, 30 from the hold position back to the retracted position.

The dock height hold device of the present invention is designed to preferably work with an active air ride suspension system. The active air ride suspension system maintains a space in between the frame 12 and suspension 14 to maintain a particular ride height. The space in between the frame 12 and suspension 14 is sufficient to rotate the pedestals 28, 30 into the hold position. Once the pedestals 28, 30 have been rotated into the hold position there is preferably a gap of approximately ¾ inch between the pedestals 28, 30 and the frame 12. This gap insures that there is sufficient clearance to move the pedestals 28, 30 between the hold and retracted positions. During loading and unloading of the cargo from the trailer to the dock area, the frame 12 is only permitted to move the distance of the ¾ inch gap, which is sufficient to maintain the frame 12 and cargo area of the trailer in a stable position.

The actuators 36, 38 are preferably pneumatic driven. More preferably the actuators 36, 38 are connected to a parking brake system 40. In operation, when the operator actuates the parking brake system 40 the actuator 36 rotates the pedestals 28, 30 from the retracted position to the hold position shown in FIGS. 1A and 1B. When the operator released the parking brake, the actuator 38 rotates the pedestal 28, 30 from the hold position back to the retracted position. More specifically, the actuator 38 deflates and the actuator 36 inflates to move the pedestals 28, 30 from the retracted position to the hold position. Conversely, the actuator 36 deflates and the actuator 38 inflates to rotate pedestals 28, 30 from the hold position back to the retracted position.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A dock height hold device for a vehicle comprising:
   a frame;
   a suspension pivotally connected to said frame and supporting an axle;
   a pedestal supported on one of said frame and said suspension, said pedestal movable between a hold position in which said pedestal extends from said one of said frame and said suspension to a location proximate the other of said frame and said suspension and a retracted position in which said pedestal is further from said other of said frame and said suspension than said location, wherein said pedestal is pivotally connected to said one of said frame and said suspension for rotation between said hold and retracted positions, and wherein said pedestal is connected to said suspension; and
   an actuator moving said pedestal between said hold and retracted positions for maintaining a desired spacing between said suspension and said frame in said hold position.

2. The device according to claim 1, wherein said pedestal is slightly spaced from said frame in said hold position.

3. The device according to claim 1, further including a pair of pedestal on opposing sides of said suspension with a shaft connecting said pedestals for rotation together.

4. A dock height hold device for a vehicle comprising:
   a frame;
   a suspension pivotally connected to said frame and supporting an axle;
   a pedestal supported on one of said frame and said suspension, said pedestal movable between a hold position in which said pedestal extends from said one of said frame and said suspension to a location proximate the other of said frame and said suspension and a retracted position in which said pedestal is further from said other of said frame and said suspension than said location;
   an actuator moving said pedestal between said hold and retracted positions for maintaining a desired spacing between said suspension and said frame in said hold position; and
   a pair of actuators with one of said actuators movable in one direction to rotate said pedestal to said hold position and the other of said actuators movable in another direction to rotate said pedestal to said retracted position.

5. The device according to claim 4, wherein one of said actuator is located proximate to one of said pedestals and the other of said actuator is located proximate to the other of said pedestals.

6. The device according to claim 1, wherein said actuator is a pneumatic cylinder.

7. A method of maintaining a vehicle dock height comprising the steps of:
   a) actuating vehicle parking brakes;
   b) activating a first actuator in a first direction;
   c) moving a holding member between a frame and suspension to minimize a vertical space between a portion of the frame and the suspension;
   d) releasing the vehicle parking brakes;
   e) activating a second actuator in a second direction; and
   f) moving the holding member from a holding position to a retracted position.

8. The method according to claim 7, wherein step c) includes rotating the holding member about a pivotal connection from a retracted position to a holding position.

* * * * *

UNITED STATES PATENT AND TRADEMARK OFFICE
CERTIFICATE OF CORRECTION

PATENT NO. : 6,634,655 B2
DATED : October 21, 2003
INVENTOR(S) : James Eckelberry It is certified that error appears in the above-identified patent and that said Letters Patent is hereby corrected as shown below:

<u>Title page,</u>
Item [73], Assignee, replace "Light" with -- Heavy --

<u>Column 4,</u>
Line 8, "pedestal" should be -- pedestals --
Line 21, insert -- and -- after "position;"
Line 22, delete "an actuator"
Lines 33 and 36, "actuator" should be -- actuators --
Line 36, insert -- one of -- between "wherein" and "said"

Signed and Sealed this

Twentieth Day of January, 2004

JON W. DUDAS
*Acting Director of the United States Patent and Trademark Office*